(12) United States Patent
Zeng

(10) Patent No.: US 10,532,538 B2
(45) Date of Patent: Jan. 14, 2020

(54) STRETCH RELEASE ADHESIVE, HOUSING ASSEMBLY AND ELECTRONIC DEVICE

(71) Applicant: GUANGDONG OPPO MOBILE TELECOMMUNICATIONS CORP., LTD., Dongguan, Guangdong (CN)

(72) Inventor: Yuanqing Zeng, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 15/991,361

(22) Filed: May 29, 2018

(65) Prior Publication Data

US 2018/0361705 A1     Dec. 20, 2018

(30) Foreign Application Priority Data

Jun. 19, 2017 (CN) ........................ 2017 1 0466150
Jun. 19, 2017 (CN) .................... 2017 2 0717989 U

(51) Int. Cl.
| | | |
|---|---|---|
| *B32B 3/02* | (2006.01) | |
| *B32B 7/12* | (2006.01) | |
| *C09J 7/40* | (2018.01) | |
| *H04M 1/02* | (2006.01) | |
| *G06F 1/16* | (2006.01) | |
| *H04W 88/00* | (2009.01) | |
| *H01M 2/10* | (2006.01) | |
| *C09J 7/38* | (2018.01) | |

(52) U.S. Cl.
CPC ............................................................
*B32B 7/12* (2013.01); *C09J 7/38* (2018.01); *C09J 7/403* (2018.01); *G06F 1/1613* (2013.01); *H01M 2/1066* (2013.01); *H04M 1/026* (2013.01); *H04W 88/00* (2013.01);

*C09J 2201/122* (2013.01); *C09J 2201/128* (2013.01); *C09J 2201/28* (2013.01); *C09J 2201/618* (2013.01); *C09J 2203/318* (2013.01); *C09J 2203/326* (2013.01); *C09J 2203/33* (2013.01); *H01M 2220/30* (2013.01)

(58) Field of Classification Search
CPC ..... B32B 7/12; C09J 7/38; C09J 7/403; G06F 1/1613; H01M 2/1066; H04M 1/026
See application file for complete search history.

(56) References Cited

U.S. PATENT DOCUMENTS

| | | | |
|---|---|---|---|
| 10,023,768 B2 * | 7/2018 | Barrios | ....................... C09J 7/29 |
| 2014/0186566 A1 * | 7/2014 | Wood | ................ A61F 13/15699 |
| | | | 428/41.8 |

FOREIGN PATENT DOCUMENTS

| | | |
|---|---|---|
| CN | 103805085 A | 5/2014 |
| CN | 105524570 A | 4/2016 |
| WO | WO 2014204803 A1 | 12/2014 |
| WO | WO 2014209622 A1 | 12/2014 |
| WO | WO 2017127293 A1 | 7/2017 |

OTHER PUBLICATIONS

European Patent Application No. 18174769.2 extended Search and Opinion dated Aug. 24, 2018, 7 pages.

* cited by examiner

*Primary Examiner* — Elizabeth E Mulvaney
(74) *Attorney, Agent, or Firm* — Lathrop Gage LLP

(57) ABSTRACT

The present disclosure provides a stretch release adhesive, a battery assembly, a housing assembly, and an electronic device. The stretch release adhesive includes a base; and a plurality of adhesive portions spaced apart from one another, each of the adhesive portions being provided on a surface of the base.

19 Claims, 3 Drawing Sheets

STRETCH RELEASE ADHESIVE, HOUSING ASSEMBLY AND ELECTRONIC DEVICE

CROSS-REFERENCE TO RELATED APPLICATIONS

The application claims priority to and benefits of Chinese Patent Application Serial No. 201710466150.5, filed with the State Intellectual Property Office of P. R. China on Jun. 19, 2017, and Chinese Patent Application Serial No. 201720717989.7, filed with the State Intellectual Property Office of P. R. China on Jun. 19, 2017. The entire contents of all above-mentioned applications are incorporated herein by reference.

FIELD

The present disclosure relates to a technical field of communication devices, and more particularly, to a stretch release adhesive, a housing assembly, and an electronic device.

BACKGROUND

In the related art, a stretch release adhesive for bonding a battery assembly in an electronic device adopts a double-sided fully coated adhesive tape. When used in rough surface bonding, there is a large proportion of the adhesive tape that is not effectively bonded and is actually suspended, and moreover, a large drawing force is required when tearing the stretch release adhesive, and hence the stretch release adhesive is easy to break.

SUMMARY

The present disclosure provides a stretch release adhesive. The stretch release adhesive according to embodiments of the present disclosure includes: a base; and a plurality of adhesive portions spaced apart from one another, each of the adhesive portions being provided on a surface of the base.

A housing assembly according to embodiments of the present disclosure includes: a housing having a mounting cavity; and the stretch release adhesive according to any one of the above embodiments, at least a part of the stretch release adhesive being bonded with an inner wall surface of the housing.

An electronic device according to embodiments of the present disclosure includes: the housing assembly according to any one of the above embodiments, and a battery located in the mounting cavity and bonded with the stretch release adhesive.

BRIEF DESCRIPTION OF THE DRAWINGS

These and additional aspects and advantages of embodiments of the present disclosure will become apparent and more readily appreciated from the following descriptions made with reference to the drawings, in which.

Figure 1:
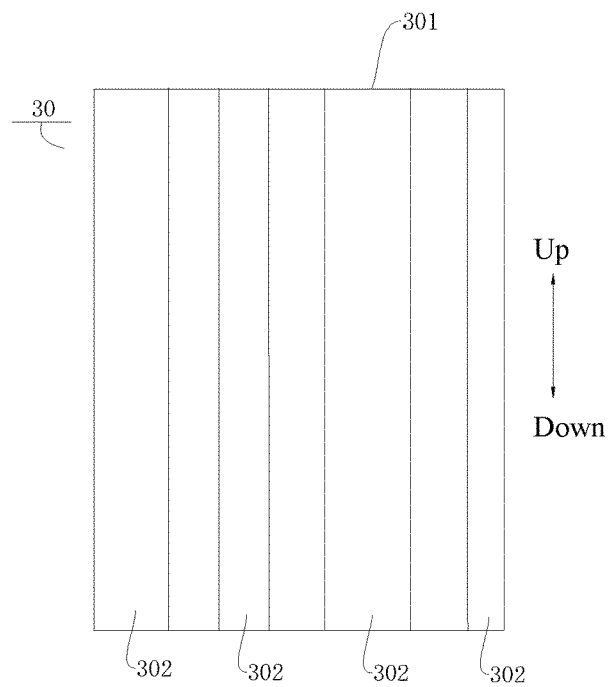
FIG. 1 illustrates a schematic view of a stretch release adhesive according to an embodiment of the present disclosure.

REFERENCE NUMERALS electronic device 1,
housing assembly 10,
housing 100, mounting cavity 101, inner wall surface 102, photographing unit 103, rough zone 104,
battery assembly 20, battery 200,
stretch release adhesive 30, base 301, first surface 301a, second surface 301b, adhesive portion 302, adhesive-free portion 303.

DETAILED DESCRIPTION

Embodiments of the present disclosure will be described in detail and examples of the embodiments will be illustrated in the accompanying drawing. The same or similar elements and the elements having same or similar functions are denoted by like reference numerals throughout the descriptions. The embodiments described herein with reference to the drawings are explanatory, which aim to illustrate the present disclosure, but shall not be construed to limit the present disclosure.

In the specification, it is to be understood that terms such as "length," "width," "thickness," "upper," "lower," "left," "right," "inner," and "outer" should be construed to refer to the orientation or position as then described or as illustrated in the drawings under discussion. These relative terms are for convenience of description, and do not indicate or imply that the device or element referred to must have a particular orientation or be constructed and operated in a particular orientation, and hence cannot be constructed to limit the present disclosure. In addition, the feature defined with "first" and "second" may indicate or imply including one or more of this feature. In the description of the present disclosure, the term "a plurality of" means two or more than two, unless specified otherwise.

In the description of the present disclosure, it should be understood that, unless specified or limited otherwise, the terms "mounted," "connected," and "coupled" and variations thereof are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

The present disclosure provides a stretch release adhesive.
The stretch release adhesive according to embodiments of the present disclosure includes: a base; and a plurality of adhesive portions spaced apart from one another, each of the adhesive portions being provided on a surface of the base.

A housing assembly according to embodiments of the present disclosure includes: a housing having a mounting cavity; and the stretch release adhesive according to the present disclosure, at least a part of the stretch release adhesive being bonded with an inner wall surface of the housing.

An electronic device according to embodiments of the present disclosure includes: the housing assembly according to the present disclosure, and a battery located in the mounting cavity and bonded with the stretch release adhesive.

A stretch release adhesive 30 according to embodiments of the present disclosure will be described below with reference to FIGS. 1-6.

Figure 3:
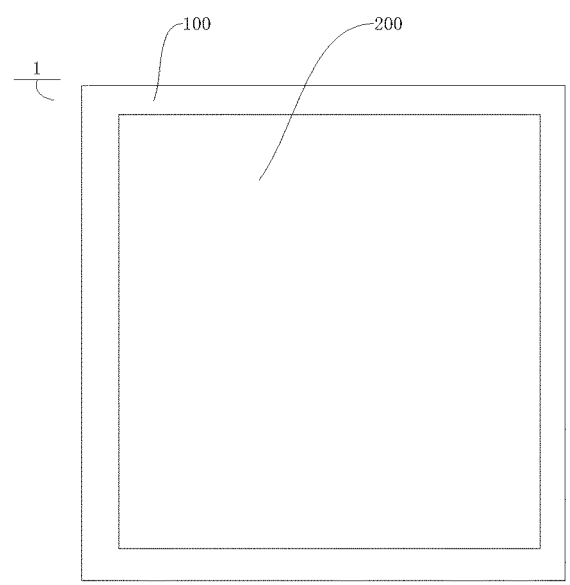
FIG. 3 illustrates a partial schematic view of an electronic device according to an embodiment of the present disclosure.
Figure 4:
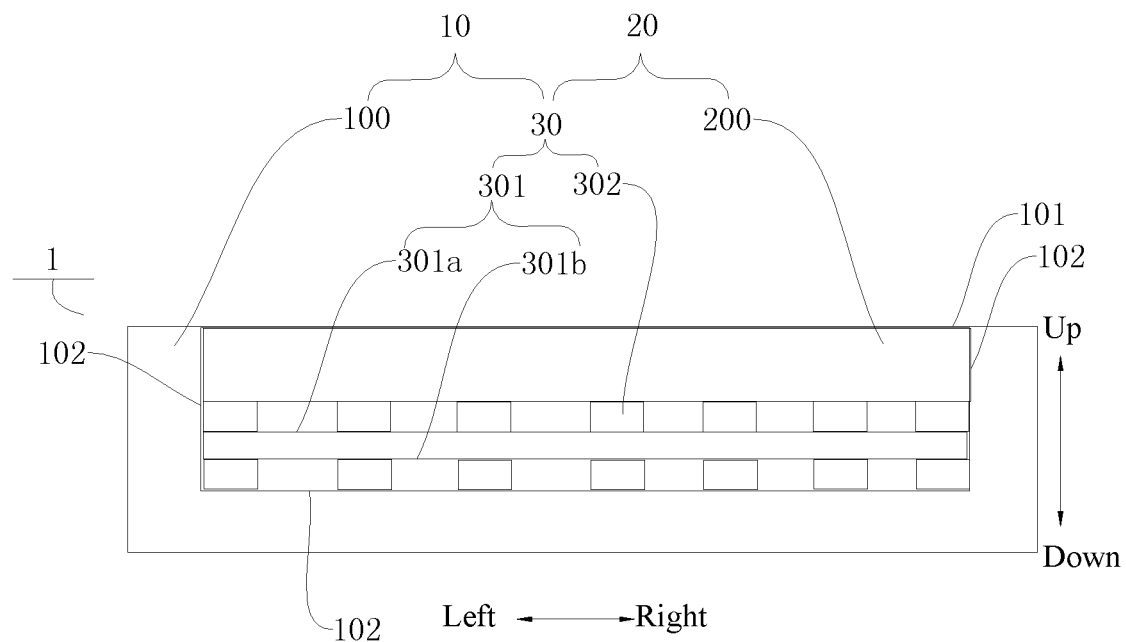
FIG. 4 illustrates a partial schematic view of an electronic device according to an embodiment of the present disclosure.

As illustrated in FIG. 1 and FIGS. 3-4, the stretch release adhesive 30 according to embodiments of the present disclosure includes a base 301 and a plurality of adhesive portions 302 spaced apart from one another; each adhesive portion 302 is provided on a surface of the base 301. It could be understood that the stretch release adhesive 30 has the base 301 and the plurality of adhesive portions 302. The adhesive portion 302 has viscidity and can be directly bonded to an article. The plurality of adhesive portions 302 are all provided on the surface of the base 301, and there is a gap between any two of the plurality of adhesive portions 302.

For the stretch release adhesive 30 according to embodiments of the present disclosure, by providing the plurality of spaced adhesive portions 302 on the base 301, it is possible to lower, by means of the gap between two adhesive portions 302, a drawing force required to tear the stretch release adhesive 30, thereby making it easily attainable to remove or tear the stretch release adhesive 30, and preventing redundant adhesive from being affixed to a surface of the article being bonded, and moreover, it is possible to discharge air between the adhesive portion 302 and the article being bonded from the gap during the bonding, so as to make the bonding more secure, thereby saving production costs without affecting an adhesive function of the stretch release adhesive 30.

Figure 6:
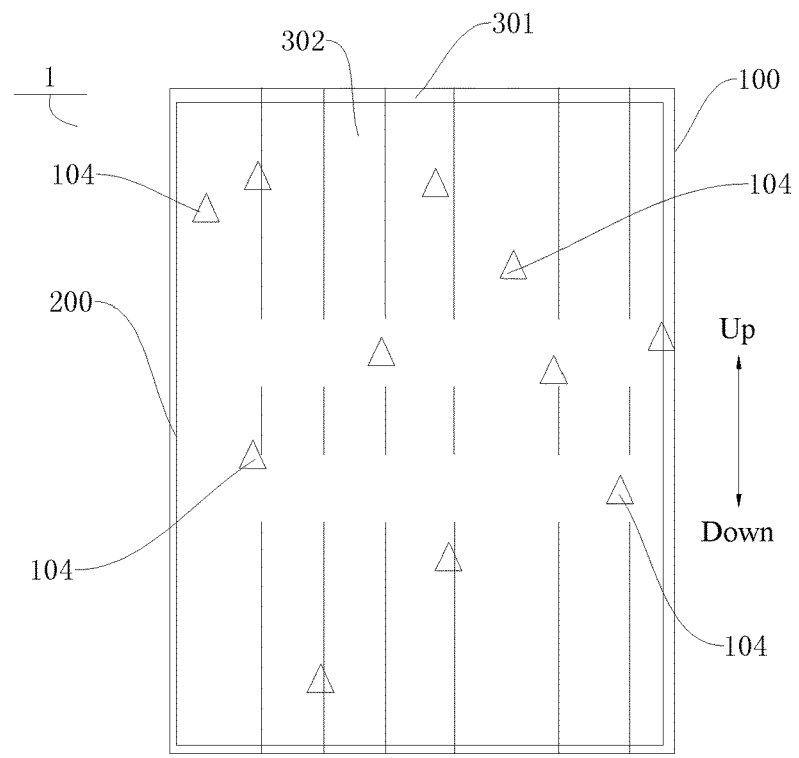
FIG. 6 illustrates a partial schematic view of an electronic device according to an embodiment of the present disclosure.
Figure 7:
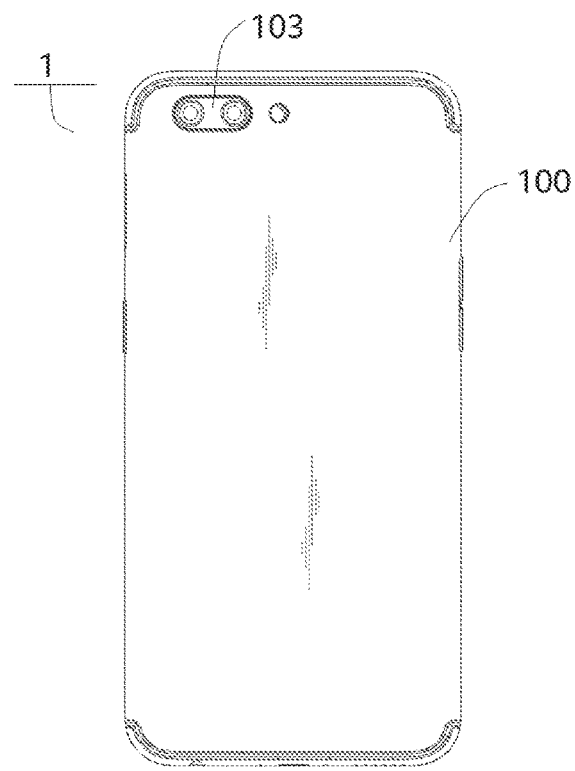
FIG. 7 illustrates a schematic view of an electronic device according to an embodiment of the present disclosure.

As illustrated in FIGS. 1 and 6, according to some embodiments of the present disclosure, the adhesive portion 302 can exhibit a strip shape, and for example, the adhesive portion 302 can be a rectangular long strip, an oval long strip, a zigzag long strip or the like. Thus, an acting force between the adhesive portion 302 and the article being bonded can be made more uniform. It should be noted that the shapes of the plurality of adhesive portions 302 can be identical or be different. For example, in an embodiment of the present disclosure, as illustrated in FIG. 1, the plurality of adhesive portions 302 are all rectangular long strips, and respective length-to-width ratios of the plurality of adhesive portions 302 are different.

Furthermore, as illustrated in FIG. 6, the adhesive portion 302 can extend along a length direction of the base 301. It could be understood that a length direction of the adhesive portion 302 is consistent with the length direction of the base 301, and the gap among the plurality of adhesive portions 302 can be in a strip shape. Thus, the number of the adhesive portions 302 can be reduced on the premise of guaranteeing the equivalent effect, thereby simplifying the production of the stretch release adhesive 30, and improving the overall aesthetics of the stretch release adhesive 30.

Figure 2:
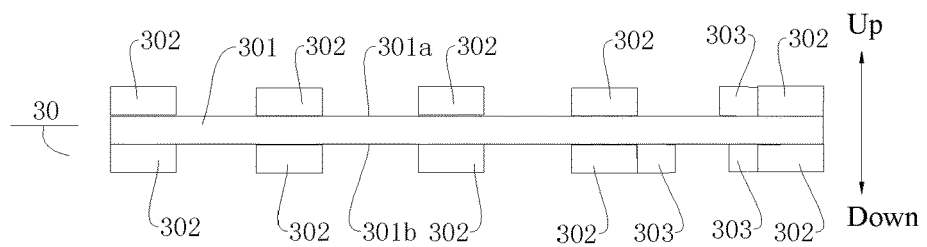
FIG. 2 illustrates a schematic view of a stretch release adhesive according to an embodiment of the present disclosure.
Figure 5:
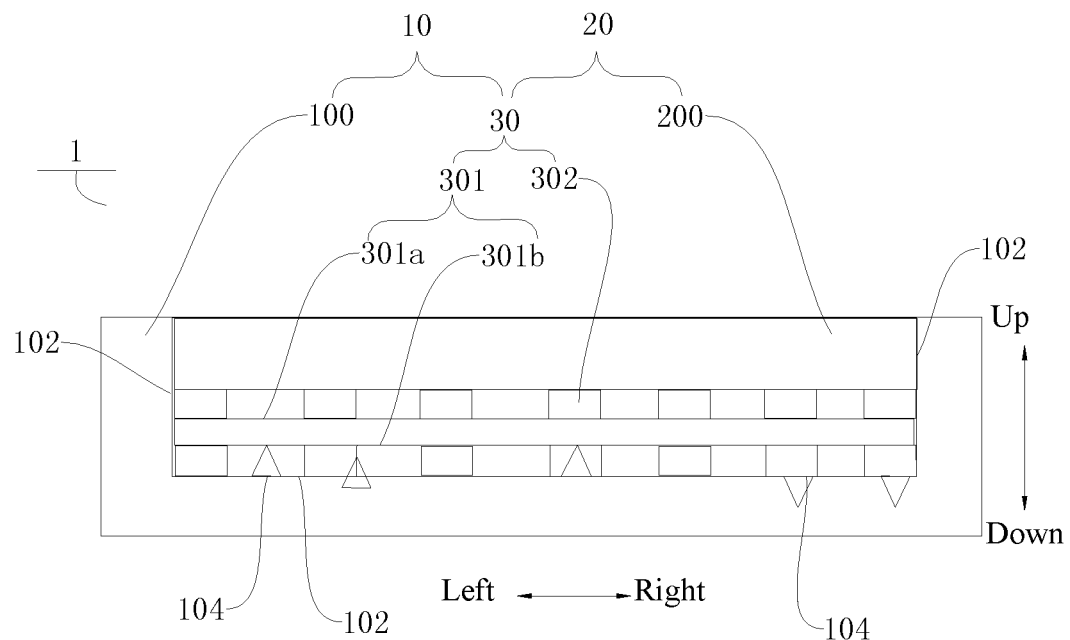
FIG. 5 illustrates a partial schematic view of an electronic device according to an embodiment of the present disclosure.

As illustrated in FIG. 2 and FIGS. 4-5, according to some embodiments of the present disclosure, the surface of the base 301 includes a first surface 301a and a second surface 301b opposite to each other, and both of the first surface 301a and the second surface 301b have the adhesive portion 302. It could be understood that the base 301 has the first surface 301a and the second surface 301b, the first surface 301a and the second surface 301b are opposite, a plurality of spaced adhesive portions 302 are distributed on the first surface 301a, and a plurality of spaced adhesive portions 302 are also distributed on the second surface 301b. Hence, two surfaces of the stretch release adhesive 30 can be both bonded to the article, so as to connect two articles together.

It should be noted that the first surface 301a can be a flat surface, a curved surface, or an uneven surface, and similarly, the second surface 301b can be a flat surface, a curved surface, or an uneven surface. For example, in some embodiments of the present disclosure, as illustrated in FIGS. 4-5, the base 301 has the first surface 301a and the second surface 301b, the first surface 301a and the second surface 301b are both flat surfaces, the plurality of adhesive portions 302 are evenly spaced and distributed on the first surface 301a and the second surface 301b, and the plurality of adhesive portions 302 on the first surface 301a and the plurality of adhesive portions 302 on the second surface 301b are symmetric with respect to the base 301.

As illustrated in FIG. 2, according to some other embodiments of the present disclosure, the stretch release adhesive 30 can further include a plurality of adhesive-free portions 303, the adhesive-free portion 303 is provided on the surface of the base 301, and each adhesive-free portion 303 is adjacent to at least one adhesive portion 302. The adhesive-free portion 303 can be made up of a non-adhesive material, such as cotton fabric, non-woven fabric or other material. The stretch release adhesive 30 includes the base 301, the plurality of adhesive-free portions 303 and the plurality of adhesive portions 302. The plurality of adhesive portions 302 are spaced and distributed on the base 301, and the gap exists between any two of the plurality of adhesive portions 302. The plurality of adhesive-free portions 303 are distributed in a plurality of gaps, one or two adhesive-free portions 303 exist in each gap, and each adhesive-free portion 303 can be adjacent to one or two adhesive portions 302. Therefore, it is possible to reduce pressure per unit area of the adhesive portion 302, so as to effectively avoid deformation of the adhesive portion 302.

A battery assembly 20 according to embodiments of the present disclosure includes a battery 200 and the above stretch release adhesive 30. At least a part of the stretch release adhesive 30 is bonded with the battery 200. For example, as illustrated in FIGS. 4-5, the surface of the base 301 includes the opposite first surface 301a and second surface 301b, the first surface 301a and the second surface 301b are both provided with the adhesive portion 302, and the battery 200 is located at a side of the battery 200 adjacent to the first surface 301a (an upper side as illustrated in FIG. 4) and is bonded with the plurality of adhesive portions 302 on the first surface 301a.

For the battery assembly 20 according to embodiments of the present disclosure, by providing the plurality of spaced adhesive portions 302 on the base 301, it is possible to lower the drawing force required to tear the stretch release adhesive 30 by using the gap between two adhesive portions 302, thereby making it easily attainable to remove or tear the stretch release adhesive 30 from the battery 200, and preventing redundant adhesive from being affixed to a surface of the battery 200, and moreover, it is possible to discharge air between the adhesive portion 302 and the battery 200 from the gap during the bonding, so as to make the bonding more secure, thereby saving production costs without affecting the adhesive function of the stretch release adhesive 30.

As illustrated in FIGS. 3-6, a housing assembly 10 according to embodiments of the present disclosure includes a housing 100 and the above stretch release adhesive 30. A mounting cavity 101 is enclosed by the housing 100, and at least a part of the stretch release adhesive 30 is bonded with an inner wall surface 102 of the housing 100 in a position corresponding to the mounting cavity 101. It could be understood that the stretch release adhesive 30 is located in the mounting cavity 101 of the housing 100, and a part of the adhesive portions 302 on the stretch release adhesive 30 is bonded with the inner wall surface 102 of the housing 100 at the position corresponding to the mounting cavity 101. For example, as illustrated in FIGS. 4-5, the surface of the base 301 includes the first surface 301a and the second surface 301b opposite to each other, and the first surface 301a and the second surface 301b both have the adhesive portion 302; the housing 100 has three inner wall surfaces 102 in the position corresponding to the mounting cavity 101, respectively located at a left side (the "left" as illustrated in FIG. 4), a lower side (the "down" as illustrated in FIG. 4), and a right side (the "right" as illustrated in FIG. 4) of the stretch release adhesive 30; the inner wall surface 102 of the housing 100 located at the lower side of the stretch release adhesive 30 is bonded with the plurality of adhesive portions 302 on the second surface 301b.

For the housing assembly 10 according to embodiments of the present disclosure, by providing the plurality of spaced adhesive portions 302 on the base 301, it is possible to lower the drawing force required to tear the stretch release adhesive 30 by using the gap between two adhesive portions 302, thereby making it easily attainable to remove or tear the stretch release adhesive 30 from the inner wall surface 102 of the housing 100 in the position corresponding to the mounting cavity 101, and preventing redundant adhesive from being affixed to the inner wall surface 102 of the housing 100 in the position corresponding to the mounting cavity 101, and moreover, it is possible to discharge air between the adhesive portion 302 and the inner wall surface 102 from the gap during the bonding, so as to make the bonding more secure, thereby saving production costs without affecting the adhesive function of the stretch release adhesive 30.

In some embodiments of the present disclosure, the housing 100 can be a magnesium alloy piece or an aluminum alloy piece. It could be understood that the material for manufacturing the housing 100 can be a magnesium alloy or an aluminum alloy. The magnesium alloy and the aluminum alloy both have advantages of high strength and light texture, and are not easy to deform, thereby being suitable as a production material of the housing assembly 10. In some examples of the present disclosure, as illustrated in FIGS. 5-6, the inner wall surface 102 of the housing 100 in the position corresponding to the mounting cavity 101 can have a rough zone 104 (a triangle in FIGS. 5-6 can represent a recess or a protrusion of a rough surface), and at least a part of the stretch release adhesive 30 is bonded with the rough zone 104. Thus, it is possible to enhance stability of the bonding between the stretch release adhesive 30 and the inner wall surface 102 of the mounting cavity 101. Furthermore, the rough zone 104 can also exist on the stretch release adhesive 30.

As illustrated in FIGS. 3-6, an electronic device 1 according to embodiments of the present disclosure includes the battery 200 and the above housing assembly 10. The battery 200 is located in the mounting cavity 101 and bonded with the stretch release adhesive 30. It could be understood that the stretch release adhesive 30 is located in the mounting cavity 101 of the housing 100, a part of the adhesive portions 302 on the stretch release adhesive 30 is bonded with the inner wall surface 102 of the mounting cavity 101, and the battery 200 is located in the mounting cavity 101 and bonded with the stretch release adhesive 30.

For example, as illustrated in FIGS. 4-5, the surface of the base 301 includes the first surface 301a and the second surface 301b opposite to each other, and the first surface 301a and the second surface 301b both have the adhesive portion 302. The battery 200 is located at the side adjacent to the first surface 301a (the upper side as illustrated in FIG. 4) and is bonded with the plurality of adhesive portions 302 on the first surface 301a. The housing 100 has three inner wall surfaces 102 in the position corresponding to the mounting cavity 101, respectively located at the left side (the "left" as illustrated in FIG. 4), the lower side (the "down" as illustrated in FIG. 4), and the right side (the "right" as illustrated in FIG. 4) of the stretch release adhesive 30. The inner wall surface 102 of the housing 100 located at the lower side of the stretch release adhesive 30 is bonded with the plurality of adhesive portions 302 on the second surface 301b.

For the electronic device 1 according to embodiments of the present disclosure, by providing the plurality of spaced adhesive portions 302 on the base 301, it is possible to lower the drawing force required to tear the stretch release adhesive 30 by using the gap between two adhesive portions 302, thereby making it easily attainable to tear the stretch release adhesive 30 from the inner wall surface 102 of the mounting cavity 101 or from the battery 200, and preventing redundant adhesive from being affixed to the inner wall surface 102 of the housing 100 or to the surface of the battery 200, and moreover, it is possible to discharge air between the adhesive portion 302 and the inner wall surface 102 or the battery 200 from the gap during the bonding, so as to make the bonding more secure, thereby saving production costs without affecting the adhesive function of the stretch release adhesive 30.

According to some embodiments of the present disclosure, an extension direction of the adhesive portion 302 of the stretch release adhesive 30 can be consistent with a disassembly direction of the battery 200. Thus, the battery 200 can be disassembled form the housing assembly 10 more conveniently and easily. For example, as illustrated in FIG. 6, the extension direction of the adhesive portion 302 of the stretch release adhesive 30 is an up-and-down direction, and the battery 200 can be disassembled from the top down or from the bottom up.

In some embodiments of the present disclosure, an arrangement density of the plurality of spaced adhesive portions 302 gradually increases in the disassembly direction of the battery 200. It could be understood that in the disassembly direction of the battery 200, the arrangement density of the adhesive portions 302 provided on the base 301 increases gradually. Therefore, when the stretch release adhesive 30 is pulled, a part of the battery 200 which is first pulled up has a small arrangement density of the adhesive portions 302 and hence is subjected to a relatively small adhesive force, such that the stretch release adhesive 30 is not easy to break; the arrangement density is large in another part of the battery 200 which is finally pulled up, and the adhesive force is relatively great, such that the stretch release adhesive 30 can not only be easily pulled but also have strong overall adhesiveness. In some other embodiments of the present disclosure, the adhesive portion 302 has a gradually increased width in the disassembly direction of the battery 200.

The electronic device 1 according to the present disclosure will be described below with reference to FIGS. 1-7. It could be understood that the following description is only exemplary illustration rather than a specific limitation on present disclosure.

In the embodiments of the present disclosure, the electronic device 1 can be various devices capable of acquiring data from the outside and processing the data, or the electronic device 1 can be any device that has a built-in battery 200 and is capable of receiving current from the outside to charge the battery 200, such as a mobile phone, a tablet computer, a computing device or an information display device.

The mobile phone is taken as an example to introduce the electronic device 1 to which the present disclosure is applicable. The mobile phone can include an ultrasonic chip, a radio frequency circuit, a memory, an input unit, a wireless fidelity (Wi-Fi) module, a display unit, a sensor, an audio circuit, a processor, a projection unit, a photographing unit 103, a battery 200, and a stretch release adhesive 30, a housing 100, and other components.

Specifically, as illustrated in FIGS. 1-7, the mounting cavity 101 is enclosed by the housing 100, the battery 200 is located in the mounting cavity 101, and the battery 200 is connected, by means of the stretch release adhesive 30, with the inner wall surface 102 of the housing 100 in the position corresponding to the mounting cavity 101. The stretch release adhesive 30 includes the base 301 and a plurality of spaced adhesive portions 302, and each adhesive portion 302 is provided on the surface of the base 301. It could be understood that the stretch release adhesive 30 has the base 301 and the plurality of adhesive portions 302, the adhesive portion 302 has viscidity and can be directly bonded to the article, the plurality of adhesive portions 302 are all provided on the surface of the base 301, and a gap exists between any two adhesive portions 302 of the plurality of adhesive portions 302. The plurality of adhesive portions 302 are rectangular long strips, and respective length-to-width ratios of the plurality of adhesive portions 302 are different. The plurality of adhesive portions 302 can extend along the length direction of the base 301.

As illustrated in FIG. 2 and FIGS. 4-5, the surface of the base 301 includes the opposite first surface 301a and second surface 301b, and both of the first surface 301a and the second surface 301b are flat surfaces. The plurality of adhesive portions 302 are evenly spaced and distributed on the first surface 301a and the second surface 301b, and the plurality of adhesive portions 302 on the first surface 301a and the plurality of adhesive portions 302 on the second surface 301b are symmetric with respect to the base 301. The battery 200 is located at the side adjacent to the first surface 301a (the upper side as illustrated in FIG. 4) and is bonded with the plurality of adhesive portions 302 on the first surface 301a. The housing 100 has three inner wall surfaces 102 in the position corresponding to the mounting cavity 101, respectively located at the left side (the "left" as illustrated in FIG. 4), the lower side (the "down" as illustrated in FIG. 4), and the right side (the "right" as illustrated in FIG. 4) of the stretch release adhesive 30. The inner wall surface 102 of the housing 100 located at the lower side of the stretch release adhesive 30 is bonded with the plurality of adhesive portions 302 on the second surface 301b.

The display unit can be embedded in a front side of the electronic device 1 and coupled with the housing 100. The display unit can be configured to display information input by or presented to the user, and various menus of the mobile phone. The display unit can include a display panel, and optionally, the display panel can be configured in forms of a liquid crystal display (LCD), an organic light-emitting diode (OLED) and the like. Further, the touch panel can overlay the display panel; when the touch panel detects a touch operation on or near it, the touch operation is sent to the processor to determine which type the touch event belongs to, and then the processor provides corresponding visual output on the display panel according to the type of the touch event. The location, which can be recognized by the user's eye in the display panel, besides the visual output, can serve as a "display area" described later. The touch panel and the display panel can be two separate components to achieve input and output functions of the mobile phone, or can be integrated to achieve the input and output functions of the mobile phone.

The radio-frequency (RF) circuit can be used to receive and transmit a signal during information transmission and reception or during a call. Especially, when downlink information from a base station is received, the RF circuit sends the downlink information to the processor for processing, and additionally sends uplink data from the mobile phone to the base station. Usually, the RF circuit includes but is not limited to an antenna, at least one amplifier, a transceiver, a coupler, a low-noise amplifier, a duplexer and etc. In addition, the RF circuit can communicate with the network and other devices via wireless communication. The wireless communication can employ any communication standard or protocol, including but not limited to global system for mobile communication (GSM), general packet radio service (GPRS), code division multiple access (CDMA), wideband code division multiple access (WCDMA), long term evolution (LTE), e-mail and short messaging service (SMS).

The memory can be used to store software programs and modules, and the processor runs various software applications in the mobile phone and performs data processing by running the software programs and modules stored in the memory. The memory can mainly include a program storage area and a data storage area. The program storage area can store an operating system, at least one application program required for a function (such as a voice playback function, an image playback function and etc.); the data storage area can store data (such as audio data, contacts and etc.) created according to the use of the mobile phone. In addition, the memory can include a high-speed random access memory, and can also include a non-volatile memory, such as at least one disk storage device and flash memory device, or include other volatile solid state memory devices.

The input unit can be configured to receive incoming numbers or character information, and generate a key signal related to user settings and function control of the mobile phone. Specifically, the input unit can include a touch panel and other input devices. The touch panel, also known as a touch screen, can collect a touch operation made by a user on or near the touch panel (for example, an operation made by the user on the touch panel or near the touch panel by means of a finger, a touch pen or any other suitable object or accessory), and drive the corresponding connection device according to a preset program. Optionally, the touch panel can include a touch detection device and a touch controller. The touch detection device is configured to detect a touch orientation of the user, detect a signal from the touch operation, and transmit the signal to the touch controller. The touch controller is configured to receive the touch signal from the touch detection device, convert it into contact coordinates and send the contact coordinates to the processor, and can be configured to receive and execute a command from the processor. In addition, it is possible to realize the touch panel in resistive type, capacitive type, infrared type, surface acoustic wave type and other types. The input unit can include other input devices apart from the touch panel. Specifically, other input devices can include, but are not limited to one or more of a physical keypad, a function key (e.g. a volume control button, an on/off button, etc.), a trackball, a mouse and an operating rod.

In addition, the mobile phone can also include at least one sensor, such as an attitude sensor, a light sensor and other sensors.

Specifically, the attitude sensor can also be referred as a motion sensor, and as one kind of motion sensor, a gravity sensor can be employed. As for the gravity sensor, a cantilever displacement device is made of an elastic-sensitive element, and an electrical contact is driven by an energy-storage spring made of the elastic-sensitive element, so as to achieve the conversion of gravity changes into electrical signal changes.

As an alternative motion sensor, an accelerometer sensor can be used. The accelerometer sensor can detect the magnitude of acceleration in all directions (generally in three axes), and detect the magnitude and direction of the gravity at rest, and can be used for attitude identification of the mobile phone (such as horizontal and vertical screen switch, related games, magnetometer attitude calibration), and vibration-recognition related functions (such as pedometer and percussion).

In the embodiments of the present disclosure, the motion sensors listed above can be used as an element for obtaining an "attitude parameter" described later, which is not limited thereto, however. Other sensors capable of obtaining the "attitude parameter" fall into the protection scope of the present disclosure, for example, a gyroscope. The working principle and data processing of the gyroscope can be similar to the related art, so the detailed description thereof will be omitted to avoid redundancy.

In addition, in the embodiments of the present disclosure, a barometer, a hygrometer, a thermometer, an infrared sensor and the like can be used as a sensor, which will not be described in detail.

The light sensor can include an ambient light sensor and a proximity sensor, in which the ambient light sensor can adjust brightness of the display panel in accordance with the ambient light, and the proximity sensor can turn off the display panel and/or backlight when the mobile phone is moved to the ear.

The audio circuit, the loudspeaker and the microphone can provide an audio interface between the user and the mobile phone. The audio circuit can transmit an electrical signal converted from the received audio data to the loudspeaker, and the loudspeaker converts the electrical signal into an audio signal to be output. On the other hand, the microphone converts the collected audio signal into the electrical signal, and the audio circuit receives and converts the electrical signal into audio data, and transmits the audio data to the processor. After processed by the processor, the audio data is sent to, for example, another mobile phone via the RF circuit, or is output to the memory for further processing.

Wi-Fi is a short distance wireless transmission technology, and the mobile phone can help the user send and receive e-mails, browse websites, and access streaming media through the Wi-Fi module which provides the user with wireless broadband access to the Internet.

The processor is a control center of the mobile phone, is connected to various parts of the mobile phone by means a variety of interfaces and lines, and performs various functions of the mobile phone and data processing by running or executing software programs and/or modules stored in the memory and by invoking the data stored in the memory, so as to monitor the mobile phone overall. Optionally, the processor can include one or more processing units; preferably, the processor can be integrated with an application processor and a modem processor, in which the application processor mainly handles the operating system, the user interface and the application program, while the modem processor mainly deals with wireless communication.

It could be understood that the modem processor may not be integrated into the processor.

Moreover, the processor can act as an implementing element of the processing unit, to perform the same or similar function as the processing unit.

It should be noted that the mobile phone is only an example of the electronic device 1 and is not constructed to limit the present disclosure. The present disclosure can be applied to the electronic device 1 such as a mobile phone, a tablet computer and so on, and the present disclosure is not limited thereto. Reference throughout this specification to "an embodiment," "some embodiments," "an exemplary embodiment," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

Although embodiments have been illustrated and described, it would be appreciated by those skilled in the art that changes, modifications, alternatives and variants can be made in the embodiments without departing from principles and purposes of the present disclosure. The protection scope of the present disclosure is defined by the claims or the like.

What is claimed is:

1. A stretch release adhesive, comprising:
   a base;
   a plurality of adhesive portions spaced apart from one another, each of the adhesive portions being provided on a surface of the base; and
   a plurality of adhesive-free portions provided on the surface of the base, each of the adhesive-free portions being adjacent to at least one of the adhesive portions, wherein each of the adhesive-free portions is made up of a non-adhesive material.

2. The stretch release adhesive according to claim 1, wherein a gap exists between any two of the plurality of adhesive portions.

3. The stretch release adhesive according to claim 1, wherein the adhesive portion exhibits a strip shape.

4. The stretch release adhesive according to claim 1, wherein the plurality of adhesive portions are all rectangular strips, and respective length-to-width ratios of the plurality of adhesive portions are different.

5. The stretch release adhesive according to claim 3, wherein the adhesive portion extends along a length direction of the base.

6. The stretch release adhesive according to claim 1, wherein the surface of the base comprises a first surface and a second surface opposite to each other, both of the first surface and the second surface having the adhesive portion.

7. The stretch release adhesive according to claim 6, wherein the first surface is one of a flat surface, a curved surface, and an uneven surface, and the second surface is one of a flat surface, a curved surface, and an uneven surface.

8. The stretch release adhesive according to claim 6, wherein the adhesive portions on the first surface and the adhesive portions on the second surface are symmetric with respect to the base.

9. A housing assembly for an electronic device, comprising:
   a housing having a mounting cavity; and
   a stretch release adhesive comprising a base; a plurality of adhesive portions, the plurality of adhesive portions being spaced apart from one another, each of the adhesive portions being provided on a surface of the base; and a plurality of adhesive-free portions provided on the surface of the base, each of the adhesive-free portions being adjacent to at least one of the adhesive portions, wherein each of the adhesive-free portions is made up of a non-adhesive material and wherein at least a part of the stretch release adhesive is bonded with an inner wall surface of the housing.

10. The housing assembly for the electronic device according to claim 9, wherein the housing is a magnesium alloy piece.

11. The housing assembly for the electronic device according to claim 9, wherein the housing is an aluminum alloy piece.

12. The housing assembly for the electronic device according to claim 9, wherein the inner wall surface of the housing has a rough zone, and at least the part of the stretch release adhesive is bonded with the rough zone.

13. The housing assembly for the electronic device according to claim 9, wherein a rough zone exists on the stretch release adhesive.

14. An electronic device, comprising:
   a housing assembly comprising a housing having a mounting cavity and a stretch release adhesive, the stretch release adhesive comprising a base; a plurality of adhesive portions, the plurality of adhesive portions being spaced apart from one another, each of the adhesive portions being provided on a surface of the base; and a plurality of adhesive-free portions provided on the surface of the base, each of the adhesive-free portions being adjacent to at least one of the adhesive portions, wherein each of the adhesive-free portions is made up of a non-adhesive material and wherein at least a part of the stretch release adhesive is bonded with an inner wall surface of the housing, and
   a battery located in the mounting cavity and bonded with the stretch release adhesive.

15. The electronic device according to claim 14, wherein the surface of the base comprises a first surface and a second surface opposite to each other, both of the first surface and the second surface having the adhesive portion, and the battery is bonded with the adhesive portions on the first surface.

16. The electronic device according to claim 15, wherein the inner wall surface of the housing is bonded with the adhesive portions on the second surface.

17. The electronic device according to claim 14, wherein the adhesive portion of the stretch release adhesive has an extension direction consistent with a disassembly direction of the battery.

18. The electronic device according to claim 17, wherein an arrangement density of the plurality of spaced adhesive portions is gradually increased in the disassembly direction of the battery.

19. The electronic device according to claim 17, wherein the adhesive portion has a gradually increased width in the disassembly direction of the battery.

* * * * *